US009882673B2

(12) United States Patent
Yensen et al.

(10) Patent No.: US 9,882,673 B2
(45) Date of Patent: Jan. 30, 2018

(54) EVENT SEQUENCER FOR A RADIO FREQUENCY SYSTEM

(71) Applicant: Allen-Vanguard Corporation, Ottawa (CA)

(72) Inventors: Trevor Noel Yensen, Ottawa (CA); Shawn Halpin, Ottawa (CA); Mike Bush, Ottawa (CA)

(73) Assignee: Allen-Vanguard Corporation, Ottawa (CA)

( * ) Notice: Subject to any disclaimer, the term of this patent is extended or adjusted under 35 U.S.C. 154(b) by 1 day.

(21) Appl. No.: 15/086,358

(22) Filed: Mar. 31, 2016

(65) Prior Publication Data

US 2016/0294502 A1 Oct. 6, 2016

Related U.S. Application Data

(60) Provisional application No. 62/140,770, filed on Mar. 31, 2015.

(51) Int. Cl.
*H04K 3/00* (2006.01)
*H04W 72/12* (2009.01)

(52) U.S. Cl.
CPC ................ *H04K 3/41* (2013.01); *H04K 3/28* (2013.01); *H04K 3/45* (2013.01); *H04K 3/42* (2013.01); *H04K 3/44* (2013.01)

(58) Field of Classification Search
CPC .. H04K 3/41; H04K 3/42; H04K 3/45; H04K 3/28; H04K 3/44; H04B 1/44; H04W 72/1247
See application file for complete search history.

(56) References Cited

U.S. PATENT DOCUMENTS 8,666,341 B2 * 3/2014 Marsolais ............. H04K 1/003 455/127.4
2013/0023201 A1 * 1/2013 Coleman ................. H04K 3/45 455/1
2015/0298654 A1 * 10/2015 Joao ....................... G01S 19/16 701/2

* cited by examiner

*Primary Examiner* — Bobbak Safaipour
(74) *Attorney, Agent, or Firm* — Elan IP Inc.

(57) ABSTRACT

A sequencer for use with an Electronic Warfare system consisting of one or more transmitters and receivers including one or more desired operations; a processor in communication with a memory; the memory storing instructions executed by the processor to sequence the one or more desired operations; an output connected to each of transmitter and receiver devices of the transceiver to control power-up and power-down sequences of the transmitter and receiver devices; wherein the instructions to sequence the one or more operations include instructions to prioritize a high-priority transmit operation such that the high-priority transmit operation is carried out in real-time upon request.

9 Claims, 3 Drawing Sheets

| Burst Type | Rx Enabled | Tx Enabled | FPEA | ES | TC |
|---|---|---|---|---|---|
| Guard Interval | | | | | |
| FPEA Tx Burst | | ✓ | ✓ | | |
| FPEA/ES Sync Burst | ✓ | | ✓ | ✓ | |
| FPEA/ES Async Burst | ✓ | | ✓ | ✓ | |
| TC Tx Burst | | ✓ | | | ✓ |
| TC Rx Burst | ✓ | | | | ✓ |

EVENT SEQUENCER FOR A RADIO FREQUENCY SYSTEM

RELATED APPLICATIONS

This application claims priority to U.S. Provisional Application No. 62/140,770 filed Mar. 31, 2015; the contents of which are herein incorporated by reference.

TECHNICAL FIELD

This invention relates generally to signal processing in radio frequency (RF) communications. More specifically it relates to an event sequencer for a consisting of one or more transmitters and receivers.

BACKGROUND

There are numerous Electronic Warfare (EW) devices that use Radio Frequency (RF) technology. Military units employ various apparatuses both offensively and defensively to protect soldiers' lives and collect signals intelligence and communicate on the battlefield.

RF devices generally send, receive, or otherwise process signals using some combination of transmitters, receivers or transceivers. In some devices capable of providing a multitude of functionalities, these capabilities are provided by a single transceiver unit. One example of such a transceiver unit was disclosed by the applicant in its prior filed PCT International Application No. PCT/CA2014/050707, entitled "System and Method for Ultra-Wideband Radio Frequency Scanning and Signal Generation" filed Jul. 25, 2014, the contents of which are incorporated by reference.

Where transceiver units are providing a multitude of functionalities, a sequencer is generally used to apportion or sequence the order of events for signals being received or transmitted. The sequencer determines the timing of events handled by the transceiver, and determines the mode of operation at any specific time. Simple sequencers provide fixed periods of time at pre-determined bandwidths for different functions, effectively defining an order of operations in a fixed and predictable manner. Other prior art sequencers are capable of prioritizing certain functions so that these occur in real time. For example, if it is desired to have incoming communications signals received in real time, the sequencer would switch the transceiver to a receive signal model as soon as an incoming signal is detected, even if this temporarily pauses any signal transmission that is occurring.

However, there are significantly more complex scenarios and military-specific events that the prior art has been unable to satisfactorily address.

SUMMARY OF THE INVENTION

In one embodiment of the invention, there is provided a sequencer for use with an Electronic Warfare system consisting of one or more transmitters and receivers including an input for receiving a signal requesting one or more desired operations; a processor in communication with a memory; the memory storing instructions executed by the processor to sequence the one or more desired operations; an output connected to each of transmitter and receiver devices of the transceiver to control power-up and power-down sequences of the transmitter and receiver devices; wherein the instructions to sequence the one or more operations include instructions to prioritize a high-priority transmit operation such that the high-priority transmit operation is carried out in real-time upon request.

In one aspect of the invention, the high-priority transmit operation comprises a jammer operation.

In another aspect of the invention, the one or more desired operations are selected from the group consisting of a jammer transmit burst, an electronic support signals intelligence (SIGINT) synchronous receiver burst; a SIGINT asynchronous receive burst, a tactical communications (TC) transmit burst, and a TC receive burst.

In another aspect of the invention, upon a condition in which each of the desired operations are requested, the instructions to sequence include instructions for the transceiver to (a) transmit a jamming signal burst; (b) receive a TC burst; (c) transmit a TC burst; (d) receive a SIGINT synchronous burst; (e) receive a SIGINT asynchronous burst; and, (f) transmit the jamming signal burst.

In another aspect of the invention, a guard interval is implemented between successive transmit and receive operations.

In another aspect of the invention, for receive operations, the sequencer instructions include instructions for placing the receiver in a state selected from the group consisting of idle, auto automatic gain control (AGC), on-demand AGC, manual gain control, capture frame and band select.

In another aspect of the invention, for jammer transmit operations, the sequencer instructions include instructions for operating the transmitter in a mode selected from the group consisting of spot jamming at a given frequency and sweep jamming at a given band, and any of the above in combination with arbitrary waveform jamming or on-the-fly parametric generated waveform.

In another embodiment of the invention, there is provided an apparatus including a transceiver and a sequencer as described above for sequencing receive and transmit operations of the transceiver.

In another embodiment of the invention, there is provided a method for sequencing the EW system transmit and receive operations including receiving a signal requesting one or more desired operations; sequencing by a sequencer the one or more desired operations to prioritize a high-priority transmit operation such that the high-priority transmit operation is carried out in real-time upon request; controlling power-up and power-down sequences of transmitter and receiver devices of the transceiver in response to the sequencing.

In one aspect of this embodiment, the high-priority transmit operation comprises a jammer operation.

In another aspect of the invention, the one or more desired operations are selected from the group consisting of a jammer transmit burst, an electronic support signals intelligence (SIGINT) synchronous receiver burst; a SIGINT asynchronous receive burst, a tactical communications (TC) transmit burst, and a TC receive burst.

In another aspect of the invention, upon a condition in which each of the desired operations are requested, the sequencer controls the transmitter and receiver devices to transmit a jamming signal burst, receive a TC burst, transmit a TC burst, receive a SIGINT synchronous burst, receive a SIGINT asynchronous burst; and, transmit the jamming signal burst.

In another aspect of the invention, a guard interval is implemented between successive transmit and receive operations.

In another aspect of the invention, wherein for receive operations, the sequencer places the receiver in a state selected from the group consisting of idle, auto automatic gain control (AGC), on-demand AGC, manual gain control, capture frame and band select.

In another aspect of the invention, for jammer transmit operations, the sequencer operates the transmitter in a mode selected from the group consisting of spot jamming at a given frequency and sweep jamming at a given band, and any of the above in combination with arbitrary waveform jamming or on-the-fly parametric generated waveform.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figures 1, 2:
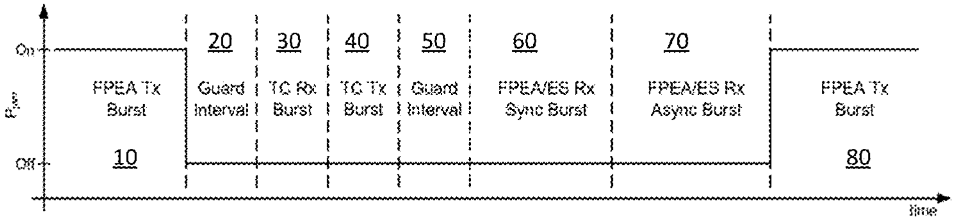
FIG. 1 illustrates an example of the sequencer operation for an electronic warfare system sequence of operations that consists of a force protection electronic attack (FPEA) transmit burst (i.e. jamming), a time-divisive duplex tactical communications receive and transmit burst and synchronous and asynchronous signals intelligence gathering receive bursts.
FIG. 2 shows the states of the transceiver for various modes of operation.

In various military applications, an Electronic Warfare system consisting of one or more transmitters and receivers requires time sequencing of events to accomplish multiple goals that require coordination. The term transceiver is used in the generic sense in this application as a unit which has receive and transmit capabilities, but is also intended to encompass separate receiver and transmitter devices whose operations could otherwise be coupled together.

Where a multitude of applications or functionalities are served by the transceiver, the sequencer as herein described determines the mode of operation at any specific time and controls the timing of events in the system. While many different functionalities are contemplated, this description will focus on a system providing three different functionalities, each of which has unique requirements and operational constraints.

Broadly, the sequencer of the invention includes an input for receiving a signal requesting one or more desired operations, and a processor in communication with a memory. The memory includes logic instructions that permit the sequencer to control power-up and power-down sequences for transmitter and receiver devices of the transceiver in order to sequence various transmit and receive operations. These logic instructions also enforce a high-priority transmit operation such that the high-priority transmit operation is carried out in real-time upon request, and prior to other operations. The high-priority transmit operation is also permitted to interrupt any other ongoing operations.

The receiver and sequencer may be implemented using hardware that is generally known in the art. In one implementation, the receiver and the sequencer are both implemented on FPGAs (field programmable gate array) with custom logic and software. In other implementations, entirely dedicated and customized hardware is also contemplated. The sequencer and receiver may be controlled by a single microprocessor or by separate microprocessors in communication with one another. One such system is shown in PCT International Application No. PCT/CA2014/050707, entitled “System and Method for Ultra-Wideband Radio Frequency Scanning and Signal Generation” filed Jul. 25, 2014, the contents of which are incorporated by reference.

The contemplated applications or modes of operation are (i) Force Protection Electronic Attack (FPEA), commonly referred to as jamming. Generally, a jamming signal is one transmitted by the EW system to interfere with an RF signal sent by a third-party to trigger an event, such as a radio controlled explosive device. The FPEA mode may also operate with the receiver capabilities to potential detect or analyze signals to be jammed; (ii) Electronic Support Signals Intelligence (ESIT) or simply ES which is the term in the art used to describe the gathering of intelligence by intercepting RF signals, whether these are communications signals between live actors or RF signals between electronic devices (such as control signals); and (iii) Tactical Communications (TC) applications, which are communications (such as orders, intelligence and operating theatre related information) generally conveyed from one actor to another in the field, typically a battlefield or other live action operating theatre where a mission is being conducted.

Each of these modes of operation may use different sub-modes that allow the transmit and receive functions of the transceiver to operate in a sequencer gated fashion, or operate in full-time transmit or receive mode with automatic or on-demand automatic gain control (AGC) operation.

The invention as herein described discloses a comprehensive manner of sequencing events that allows for interoperability of FPEA (jamming), ESIT and TC. Generally, jamming functions generate interference and the sequencer as herein described permits the jammer to go quiet without impacting performance, while allowing other functions to continue. The disclosure relates particularly to managing these quiet periods of the EW system and other timing configurations.

Sequencer Operation

The operation of the sequencer is important to the function of the transceiver as it controls the timing of events in the system. The sequencer determines the mode of operation of the transceiver at any specific time. Within the transceiver, the transmitter or receiver can determine the state based on alignment of the event sequence relative to GPS time, for example by phase-locking the oscillator within the transceiver to 1PPS from its GPS receiver.

In the present embodiment, there are six programmable states which may occur in any order to be controlled by the sequencer. These are (i) a guard interval; (ii) FPEA transmit burst; (iii) FPEA or ES receiver synchronous burst; (iv) FPEA or ES receiver asynchronous burst; (v) TC transmit burst; and, (vi) TC receive burst. These state definitions can also be understood to include more than the six states if the FPEA and ES receive functions are considered distinctly from one another, however this is not generally practical or efficient in a real world implementation.

For greater clarity, it is also noted that the transmitter and the receiver do not need to be configured with a globally unique event sequence. Each transmitter or receiver may have its own sequence whereby if full-duplex operation on a single channel is desired an event sequence may be generated that allows transmit during a burst and receive during the same burst, for example.

Within these six programmable states (and possibly others of lower importance), the FPEA or jamming functionality must always be given precedence and allocated its requested bandwidth in a priority fashion over the other states. This is due to the practical consequences and importance of real-time or near real-time responsiveness of a jamming signal, the failure of which could have devastating consequences in operation. Generally, the invention allows for the sequencing of events that allows for the interoperability of jamming communications, and communications of the other programmable states. Jammers by virtue of their operations generate interference. The sequencer as herein described allows the jammer to go quiet, while allowing other states to function in these quiet times, without measurably increasing the risk of missing a required jamming signal.

Referring now to FIG. 1, there is shown an example of the aforementioned states of operation with respect to the FPEA functionality of the EW system. FIG. 1 charts the jamming output power on the left axis versus time on the bottom axis. A typical operation sequence may include a transmit window 10 followed by a guard interval 20 to assure that the transmitter has sufficiently ramped down its output (to avoid signal interference with the next timed event). A TC receive burst window 30 opens next followed by a TC transmit burst 40 to complete a communications sequence. A second guard interval 50 would typically follow next, after which FPEA/ES synchronous 60 and asynchronous 70 burst periods occur. Finally, there is a return to an FPEA transmit window 80. The TC, FPEA receive and ES receive windows are all optional and would only be present where needed in specific instances. The guard intervals may be inserted at any time.

The communications burst is divided up into transmit or receive (or full-duplex if transmit and receive are specified on the transmitter and receiver modules simultaneously) modes of operation. From the receiver's perspective the receiver is inoperable in the communications transmit burst and operating during the receive burst.

The synchronous burst window 60 allows the jammer or ES application to receive ambient signals without being interrupted by either the jammer transmitter or communications transmitter. The synchronous burst 60 is used for a sequence of band scans that will fit exactly within the burst window such that they occur at a deterministic time and are all completed in the burst window. The deterministic time is important for events that must occur at the same time on multiple receivers that are not collocated by are synchronized by GPS.

The asynchronous burst window 70 allows the jammer or ES application to receive ambient signals without being interrupted by either the jammer transmitter or communications transmitter. The asynchronous burst is used for a sequence of band scans that may or may not fit within the time constraints of the burst window. This is typically used for a long ES scan sequence that does not need to occur at a deterministic time, cannot be satisfied by a single burst window and is met by the receiver over several asynchronous burst windows.

FIG. 2 summarizes whether the receiver or transmitter is operational, and which modes of operation are (or could be) active during the various windows of FIG. 1

Receiver Operation

When the receiver is active in a receiver communications or FPEA burst then the programmable receiver sequencer determines the activities in the current burst. These activities could include a number of different states including (i) idle; (ii) automatic AGC; (iii) on-demand AGC; (iv) manual attenuation; (v) capture frame; and (vi) retune to a different band. Each of states (ii)-(iv) could also be coupled with a capture frame state.

The burst sequence of the states is programmable and the burst sequencer automatically pauses or restarts the sequencer depending on the mode of the sequencer. For communications and synchronous burst windows the pointer to the burst activities list is reset to the beginning of the event list when the burst window completes. This ensures that these burst events occur at a fixed pre-determined time in the blanking sequence at each blanking sequence receive window. This is typically required for operations that must be time synchronized between multiple receivers, such as communications or for operations such as geolocation.

For asynchronous burst windows the pointer to the burst event list is not reset at the beginning of an asynchronous burst such that the list of events is completed over time.

Figure 3:
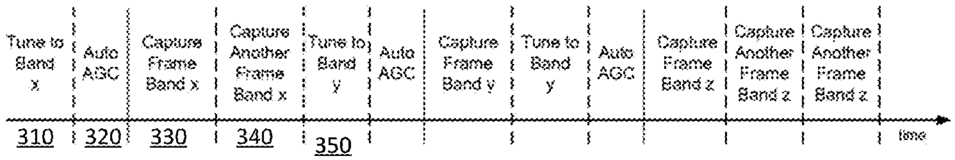
FIG. 3 shows an example of the receiver operating with automatic AGC.

In one example, the receiver burst sequencer operates in an automatic AGC mode of operation for three bands. Referring to FIG. 3, the band is tuned 310, then the AGC automatically runs 320, followed by a capture of a frame of data 330, and any subsequent frames 340 if required by the sequence. After these frame captures, the sequencer transitions into tuning to the next band 350, with these steps repeating for each required band, as depicted by bands x, y and z in FIG. 3.

Figure 4:
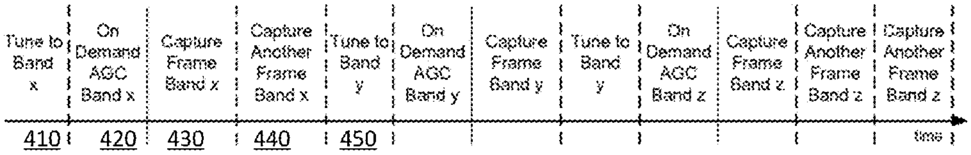
FIG. 4 shows an example of the receiver operating with on-demand AGC.

In the on-demand AGC situation shown in FIG. 4, the AGC will only operate for a given band if a request for the AGC is flagged by the microprocessor for data capture in the given band. If the request for the AGC is not present or flagged then no time is allocated for performing the AGC operation, and it does not occur. In FIG. 4, the sequencer tunes the receiver to band x 410, and if a request for the AGC in band x is present, time is allocated for performing the AGC operation in band x 420. If not, the time of this operation is set to zero and does not occur. The frame capturing 430, 440 and subsequent tuning 450 occur in sequence, with the AGC in subsequent bands occurring only if these requests are flagged by the microprocessor.

Figure 5:
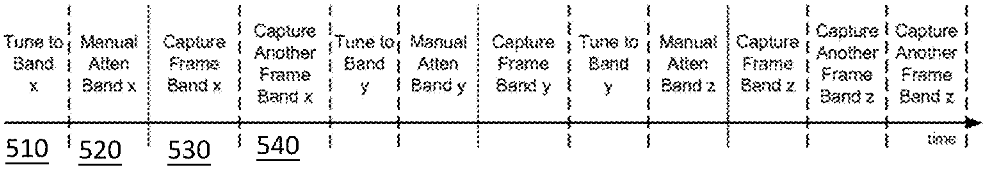
FIG. 5 shows an example of the receiver operating with manual gain control.

Manual gain control is also possible as shown in FIG. 5. In this variation, the receiver burst is responsive to attenuation settings for given bands as set by the microprocessor, either based on pre-programmed parameters or real-time instructions provided by a user. Manual attenuation of each band 520 succeeds tuning 510 and precedes data capture 530, 540.

Figure 6:
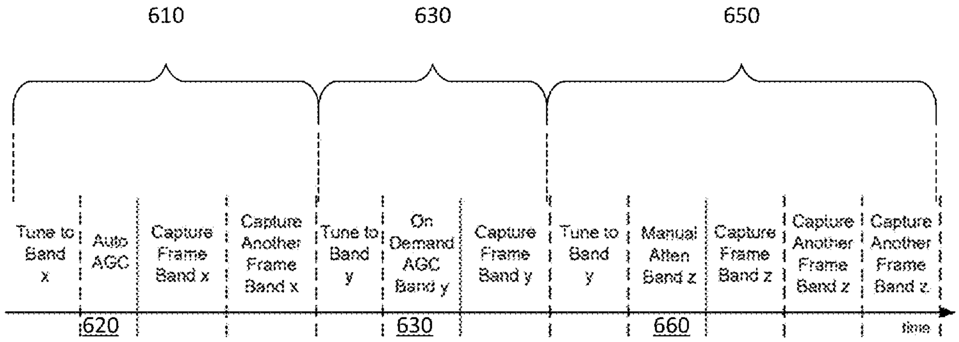
FIG. 6 shows an example of the receiver operating with mixed-mode gain control.

Finally, the sequencer is also capable of mixed mode operation since the gain control mode is user configurable. As illustrated in FIG. 6, data is captured from band x 610 using automatic AGC 620, captured from bandy 630 via on-demand AGC 640, and from band z 650 via manual gain control 660. Numerous variations on the mixed mode operation are possible and can encompass all possible bands in which data is being captured using any combination of the different modes of operation as described.

Transmit Operation

Transmit operations may differ depending on the data being transmitted. Specifically, an FPEA or jammer transmitter generally differs from a TC transmitter. The behavior of the FPEA transmitter during a transmit burst is governed by the rules of the sequencer. For active jamming applications, the sequencer presents an a priori schedule of events. For responsive jamming applications, the sequencer combines the active schedule with a schedule that is generated in real-time. Active jamming occurs where a defined and known frequency band is being jammed. Responsive jamming occurs where the jammer scans for particular signals and transmits a jamming signal in response to a detected signal.

Figure 7:
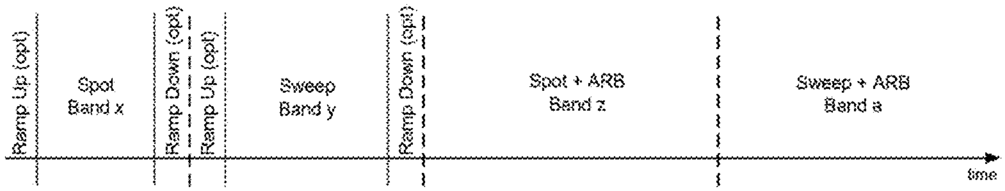
FIG. 7 shows an example of a jamming signal transmission.

Referring now to FIG. 7, there are four modes of transmitter operation shown for this FPEA applications: (i) spot jamming at a given frequency; (ii) sweep jamming a given band; (iii) spot and arbitrary waveform jamming for given frequencies; and (iv) sweep and arbitrary waveform jamming for a given band.

Spot jamming is characterized by a particular centre frequency and duration. Sweep jamming is characterized by a particular start frequency and a particular stop frequency, period, step-size and step duration. Both spot and sweep jamming may optionally be characterized by a ramp which is enabled at both the start and end of the spot or sweep.

Spot and sweep jamming may also be combined with an arbitrary waveform that is either stored a priori in memory or generated using user defined parameters on-the-fly. The a priori waveform may be played back from a static file stored in volatile memory attached to the FPGA implementing the transceiver or streamed over a protocol such as PCIe. Also, a dynamic file may be generated by the microprocessor or FPGA and optionally streamed over PCIe for arbitrary signal generation or for digital radio frequency memory style jamming techniques, the principles of which are known in the art.

On the other hand, the behavior of the transmitter for TC applications during a transmit burst is governed by the rules of the radio. Generally, the radio will request that the transmitter tune to a band and then transmission will occur using samples fed to a digital to analog converter. It is possible for the centre frequency to hop around within a transmit window by specifying more than one centre frequency. Typically, a single centre frequency per burst will be specified and the microprocessor will request that the centre frequency change between bursts. This is illustrated in FIG. 7.

This concludes the descriptions of the preferred embodiments. The description should be understood as illustrative of the invention, but should not be considered as limiting the invention, which are limited by solely by the claims which now follow.

The invention claimed is:

1. A sequencer for use with an Electronic Warfare system consisting of one or more transmitters and receivers comprising:

- a processor in communication with a memory; said memory storing instructions executed by said processor to sequence said one or more desired operations;
- an output connected to each of transmitter and receiver devices of the transceiver to control power-up and power-down sequences of said transmitter and receiver devices;
- wherein said instructions to sequence said one or more operations include:
  - instructions to prioritize a high-priority transmit operation such that said high-priority transmit operation is carried out in real-time upon request
- wherein said high-priority transmit operation comprises a jammer operation;
- wherein said one or more desired operations are selected from the group consisting of a jammer transmit burst, an electronic support signals intelligence (SIGINT) synchronous receiver burst a SIGINT asynchronous receive burst, a tactical communications (TC) transmit burst, and a TC receive burst;
- wherein upon a condition in which each of said desired operations are requested, the instructions to sequence include instructions for the transceiver to:
  - transmit a jamming signal burst;
  - receive a TC burst;
  - transmit a TC burst;
  - receive a SIGINT synchronous burst;
  - receive a SIGINT asynchronous burst; and,
  - transmit the jamming signal burst.

2. The sequencer according to claim 1, wherein a guard interval is implemented between successive transmit and receive operations.

3. The sequencer according to claim 1, wherein for receive operations, the sequencer instructions include instructions for placing the receiver in a state selected from the group consisting of idle, auto automatic gain control (AGC), on-demand AGC, manual gain control, capture and band select.

4. The sequencer according to claim 1, wherein for jammer transmit operations, the sequencer instructions include instructions for operating the transmitter in a mode selected from the group consisting of spot jamming at a given frequency and sweep jamming at a given band, and any of the above in combination with arbitrary waveform jamming stored a priori in memory or generated from user parameters on-the-fly.

5. An apparatus comprising

- a system consisting of one or more transmitters and receivers;
- a sequencer as defined in claim 1 for sequencing receive and transmit operations of said transceiver.

6. A method for sequencing transceiver transmit and receive operations comprising

- receiving a signal requesting one or more desired operations;
- sequencing by a sequencer said one or more desired operations to prioritize a high-priority transmit operation such that said high-priority transmit operation is carried out in real-time upon request;
- controlling power-up and power-down sequences of transmitter and receiver devices of the transceiver in response to said sequencing;
- wherein said high-priority transmit operation comprises a jammer operation;
- wherein said one or more desired operations are selected from the group consisting of a jammer transmit burst, an electronic support signals intelligence (SIGINT) synchronous receiver burst a SIGINT asynchronous receive burst, a tactical communications (TC) transmit burst, and a TC receive burst;
- wherein upon a condition in which each of said desired operations are requested, the instructions to sequence include instructions for the transceiver to:
- transmit a jamming signal burst;
- receive a TC burst;
- transmit a TC burst;
- receive a SIGINT synchronous burst;
- receive a SIGINT asynchronous burst; and,
- transmit the jamming signal burst.

7. The method according to claim 6, wherein a guard interval is implemented between successive transmit and receive operations.

8. The method according to claim 6, wherein for receive operations, the sequencer places the receiver in a state selected from the group consisting of idle, auto automatic gain control (AGC), on-demand AGC, manual gain control, capture frame and band select.

9. The method according to claim 6, wherein for jammer transmit operations, the sequencer operates the transmitter in a mode selected from the group consisting of spot jamming at a given frequency and sweep jamming at a given band, and any of the above in combination with arbitrary waveform jamming.

* * * * *